W. McARTHUR
Animal-Trap.

No. 216,430. Patented June 10, 1879.

Witnesses:
F. B. Townsend
N. W. Munday

Inventor:
Warren McArthur per Munday & Evarts
Attorneys.

UNITED STATES PATENT OFFICE.

WARREN McARTHUR, OF CHICAGO, ILLINOIS.

IMPROVEMENT IN ANIMAL-TRAPS.

Specification forming part of Letters Patent No. 216,430, dated June 10, 1879; application filed March 24, 1879.

*To all whom it may concern:*

Be it known that I, WARREN McARTHUR, of Chicago, in the county of Cook and State of Illinois, have invented certain Improvements in Animal-Traps, of which the following is a specification.

Figure 1:
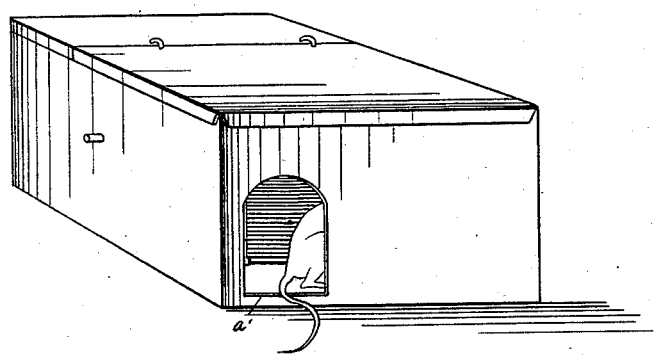
Figure 2:
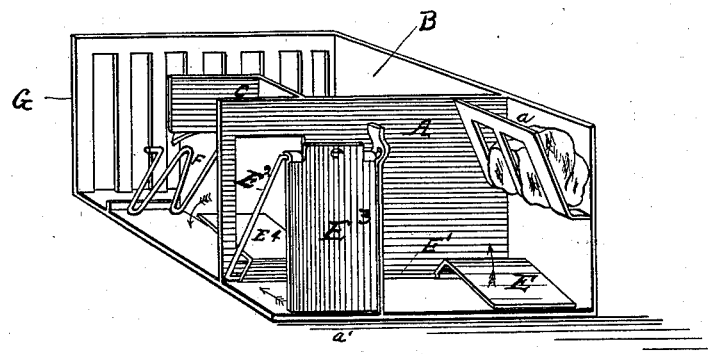
Figure 3:
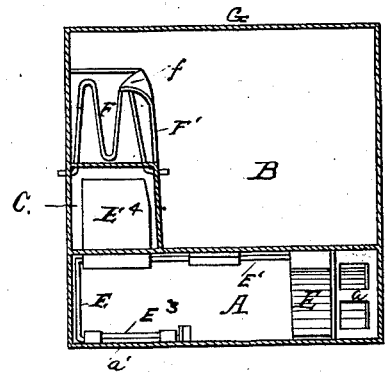

In the acompanying drawings, which form a part of this specification, Figure 1 is an exterior perspective view of my improved animal-trap. Fig. 2 is a similar view with two sides and the cover of the structure removed to show the interior. Fig. 3 is a horizontal section, showing the structure in plan view.

Like letters of reference used in the several figures denote like parts.

This invention relates to certain improvements in animal-traps; and my object therein has been to devise a form of trap which is not only very cheap, but at the same time safe and reliable in its operation.

The first feature of the invention consists in the construction of a trap in two compartments, having a connecting passage-way between them, the entrance to which passage from that one of said chambers known as the "bait-chamber" is closed when the outside entrance to said chamber is open, and is open when the outside entrance to said chamber is closed, by means of a rock-shaft carrying a swinging door for both entrances.

Another feature consists in the combination of the two compartments and the passage-way when the outer and inner doorways are both closed alternately by a door operated by a rock-shaft provided with two tilting platforms, the depression of one of which operates to swing the door against one opening, and the depression of the other of which operates to swing the door against the other opening.

A third feature of the invention consists in the combination of the bait-chamber, the prison-chamber, the passage-way, the swinging door for closing alternately the outside entrance and the entrance to the passage-way, the rock-shaft, and the platforms for actuating the same, and an inclined gate, lifted by the animal in passing from the bait to the prison-chamber, and closing by its own weight.

The invention further consists in some details of construction which are fully explained in the following portions of this specification.

The entire trap should preferably be made of metal, as this avoids the danger of the gnawing out of captured animals; and it may be easily constructed of sheet metal and wire, as shown in the drawings.

The interior is divided into two compartments. The one marked A is the bait-chamber, and the one marked B is the prison or trap proper. The passage from the bait-chamber to the prison is through a third or sub chamber or hall, (marked C,) which, like the other chambers, is inclosed by metal partition-walls extending clear up to the top of the structure.

The bait-chamber A extends entirely across one end of the structure, and has at one of its ends a bait holder or rack, $a$. At the other end of the bait-chamber is the entrance $a'$, which remains open when the trap is set. Into this open doorway the mouse or other animal enticed by the smell of the bait enters, seeing before him if there is any light nothing but what appears to be a blank wall. Guided by the scent of the bait, he turns to the right and reaches the end of the chamber containing the bait-rack. As he attempts to reach the bait, which is placed somewhat above, he encounters the platform E, pressing it enough to cause it to fall. This platform E is attached to a rock-shaft, $E^1$, which carries at the other end an arm, $E^2$, to which the door $E^3$ is swung in such manner that its own weight will close it when thrown past the center in either direction. This single door operates to close two openings at intervals—that is to say, when swung outward, as at Fig. 2, it closes the main entrance or front door, so to speak, of the structure, and when swung inward closes the opening from the bait-chamber into the passage-way C.

Attached to the same rock-shaft is a tilting platform, $E^4$, extending into the passage-way C. Now, to resume, the mouse, when he touches the platform E, in order to reach the bait, throws said platform down, and through the medium of the rock-shaft causes the door $E^3$ to swing back and close the entrance-opening. The mouse thereupon, naturally disturbed by the noise, turns to escape by the way he came, but discovers the door closed, and seeing the opening into the chamber C enters there. No sooner has he borne his weight upon the tilting platform E⁴, which forms the floor of this chamber, than the platform sinks beneath him, actuating the rock-shaft and causing the door E⁴ to swing back again, opening the outer doorway and closing the opening into chamber C, thus resetting the trap. The animal not being able to return goes forward, lifting the inclined gate F, which falls behind him, and enters the prison-chamber, from whence there is no escape.

It will be noticed that the platform E⁴ is L-shaped. This is in order that the door E³ may rest against it and the entire opening into chamber C be concealed and closed, in order that the mouse entering the bait-chamber may not be frightened by seeing into the prison or by smelling other mice therein.

In order that the door may close tightly at the bottom when swung against the outer opening, I provide at its top a projecting flange, e, which strikes against the wall above the doorway, and by the leverage causes the lower portion of the door to swing closely shut by the weight of the door itself.

The action of the rock-shaft is a little peculiar. The door, as previously stated, is swung to an arm connected to one end of said shaft. When the door is in a position to close the inner opening this arm stands nearly vertical, with just enough incline toward the inner opening to balance it in that position. When the platform beneath the bait-rack is depressed enough to move this arm slightly to the other side of the center, the weight of the door then causes it to fall against the outer opening rapidly and firmly, leaving the arm at a considerable incline in that direction. This arrangement and construction causes the action of the door to be very certain indeed, and removes the liability to stick and clog, which is a fault with the working parts of some traps.

It will be seen that the weight of the animal is not relied upon to operate the door in entrapping him, but the weight of the door; nor is the weight of the animal relied upon at any time to operate the trap except to reset it; and this is an advantage, because it is found that the animal is less cautious while attempting to escape over the platform in the passage C than he is while approaching the bait, and at such a moment is more likely to throw his weight upon a moving platform in a narrow passage than he is before he is conscious of being entrapped.

The metal continuation of the chamber C, inclosing the inclined gate F, forms a short wall, F′. This, like the other walls, may be made of sheet metal; and I prefer to bend a corner, f, down, as shown in the drawings, which accomplishes two purposes—first, it prevents the inclined gate from being lifted too high, and, second, its sharp point hinders the animal from climbing upon the gate.

It will be noticed the cage or prison has one side made of open-work, and that this side G, thus made open in order to admit light into the prison-chamber that the animal may be further induced to seek his escape is the side farthest from the main opening to the trap.

I claim—

1. The trap made in two compartments, having a connecting passage-way between them, the entrance to which passage from the bait-chamber is closed when the outside entrance to said chamber is open, and is open when the outside entrance to said chamber is closed, by means of a rock-shaft carrying a swinging door for both said entrances, substantially as set forth.

2. The combination, in a trap having two compartments and a communicating passage-way, of an outer doorway and an inner doorway, so placed that the same rock-shaft may operate a door for both openings to close both doorways alternately, said door being swung to a rock-shaft provided with two tilting platforms, the depression of one of which swings the door against the outer opening, and the depression of the other of which swings the door against the inner opening, substantially as specified.

3. The combination of the two chambers, one containing the bait and the other being the prison, the sub-chamber or passage-way, the swinging shutter for closing alternately the outside entrance to the bait-chamber and the entrance to the passage-way from the bait-chamber, the rock-shaft and platform for the same, and the inclined trap-gate, lifted by the animal and closing by its own weight, separating the passage-way from the prison, substantially as specified.

4. In an animal-trap, and in combination therewith, a transferable door, whereby two widely-separate openings may be closed by the same door, substantially as specified.

5. In combination with a trap, the swinging door carried by a rock-shaft and provided with a projection, e, beyond the pivotal point of suspension, substantially as specified.

6. The combination, with the swinging gate mounted in the passage C, of the turned-over corner of the wall of said passage, serving as a guard for the gate and as a pricker to deter the animal from escape, substantially as set forth.

WARREN McARTHUR.

Witnesses:
JAS. A. COWLES,
H. M. MUNDAY.